US006465917B2

(12) United States Patent
Wetzel et al.

(10) Patent No.: US 6,465,917 B2
(45) Date of Patent: *Oct. 15, 2002

(54) SPACEBLOCK DEFLECTOR FOR INCREASED ELECTRIC GENERATOR ENDWINDING COOLING

(75) Inventors: Todd Garrett Wetzel, Niskayuna, NY (US); Emil Donald Jarczynski, Scotia, NY (US); Christian Lee Vandervort, Voorheesville, NY (US); Samir Armando Salamah, Niskayuna, NY (US); Wayne Nigel Owen Turnbull, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 13 days.

This patent is subject to a terminal disclaimer.

(21) Appl. No.: 09/739,359

(22) Filed: Dec. 19, 2000

(65) Prior Publication Data

US 2002/0074869 A1 Jun. 20, 2002

(51) Int. Cl.[7] .............................. H02K 9/04; H02K 9/02
(52) U.S. Cl. .............................. 310/61; 310/52; 310/58; 310/64; 310/65
(58) Field of Search ................ 310/52, 58, 59, 310/60 R, 64, 60 A, 65, 270, 61

(56) References Cited

U.S. PATENT DOCUMENTS 2,778,959 A * 1/1957 Kilner .......................... 310/64
2,844,746 A * 7/1958 Coggeshall ................... 310/270
2,904,708 A * 9/1959 Willyoung ..................... 310/64
5,644,179 A * 7/1997 Staub et al. ................... 310/65
6,204,580 B1 * 3/2001 Kazmierczak ................ 310/261
6,252,318 B1 * 6/2001 Kazmierczak ................ 310/260
6,339,268 B1 * 1/2002 Kaminski et al. ............. 310/59

FOREIGN PATENT DOCUMENTS

JP     2000-350412     * 12/2000     ............ H02K/9/04

OTHER PUBLICATIONS

U.S. application Ser. No. 09/739,358 filed Dec. 19, 2000.
U.S. application Ser. No. 09/739,360 filed Dec. 19, 2000.
U.S. application Ser. No. 09/741,896 filed Dec. 22, 2000.

* cited by examiner

Primary Examiner—Burton S. Mullins
(74) Attorney, Agent, or Firm—Nixon & Vanderhye PC

(57) ABSTRACT

A gas cooled dynamoelectric machine is provided that is comprised of a rotor, a rotor winding comprising axially extending coils and concentric endwindings, and a plurality of spaceblocks located between adjacent endwindings thereby to define a plurality of cavities, each bounded by adjacent spaceblocks and adjacent endwindings. To enhance the heat transfer rate from the copper end turns of the field endwinding region, at least one flow deflector structure is provided on a cavity facing surface of at least one spaceblock for intercepting and redirecting circulating coolant flow towards a central region of the respective cavity.

20 Claims, 5 Drawing Sheets

SPACEBLOCK DEFLECTOR FOR INCREASED ELECTRIC GENERATOR ENDWINDING COOLING

BACKGROUND OF THE INVENTION

The present invention relates to a structure for enhanced cooling of generator rotors by distributing more coolant towards the normally starved center of the cavity.

The power output rating of dynamoelectric machines, such as large turbo-generators, is often limited by the ability to provide additional current through the rotor field winding because of temperature limitations imposed on the electrical conductor insulation. Therefore, effective cooling of the rotor winding contributes directly to the output capability of the machine. This is especially true of the rotor end region, where direct, forced cooling is difficult and expensive due to the typical construction of these machines. As prevailing market trends require higher efficiency and higher reliability in lower cost, higher-power density generators, cooling the rotor end region becomes a limiting factor.

Turbo-generator rotors typically consist of concentric rectangular coils mounted in slots in a rotor. The end portions of the coils (commonly referred to as endwindings), which are beyond the support of the main rotor body, are typically supported against rotational forces by a retaining ring (see FIG. 1). Support blocks are placed intermittently between the concentric coil endwindings to maintain relative position and to add mechanical stability for axial loads, such as thermal loads (see FIG. 2). Additionally, the copper coils are constrained radially by the retaining ring on their outer radius, which counteracts centrifugal forces. The presence of the spaceblocks and retaining ring results in a number of coolant regions exposed to the copper coils. The primary coolant path is axial, between the spindle and the bottom of the endwindings. Also, discrete cavities are formed between coils by the bounding surfaces of the coils, blocks and the inner surface of the retaining ring structure. The endwindings are exposed to coolant that is driven by rotational forces from radially below the endwindings into these cavities (see FIG. 3). This heat transfer tends to be low. This is because according to computed flow pathlines in a single rotating end winding cavity from a computational fluid dynamic analysis, the coolant flow enters the cavity, traverses through a primary circulation and exits the cavity. Typically, the circulation results in low heat transfer coefficients especially near the center of the cavity. Thus, while this is a means for heat removal in the endwindings, it is relatively inefficient.

Various schemes have been used to route additional cooling gas through the rotor end region. All of these cooling schemes rely on either (1) making cooling passages directly in the copper conductors by machining grooves or forming channels in the conductors, and then pumping the gas to some other region of the machine, and/or (2) creating regions of relatively higher and lower pressures with the addition of baffles, flow channels and pumping elements to force the cooling gas to pass over the conductor surfaces.

Some systems penetrate the highly stressed rotor retaining ring with radial holes to allow cooling gas to be pumped directly alongside the rotor endwindings and discharged into the air gap, although such systems can have only limited usefulness due to the high mechanical stress and fatigue life considerations relating to the retaining ring.

If the conventional forced rotor end cooling schemes are used, considerable complexity and cost are added to rotor construction. For example, directly cooled conductors must be machined or fabricated to form the cooling passages. In addition, an exit manifold must be provided to discharge the gas somewhere in the rotor. The forced cooling schemes require the rotor end region to be divided into separate pressure zones, with the addition of numerous baffles, flow channels and pumping elements—which again add complexity and cost.

If none of these forced or direct cooling schemes are used, then the rotor endwindings are cooled passively. Passive cooling relies on the centrifugal and rotational forces of the rotor to circulate gas in the blind, dead-end cavities formed between concentric rotor windings. Passive cooling of rotor endwindings is sometimes also called "free convection" cooling.

Passive cooling provides the advantage of minimum complexity and cost, although heat removal capability is diminished when compared with the active systems of direct and forced cooling. Any cooling gas entering the cavities between concentric rotor windings must exit through the same opening since these cavities are otherwise enclosed— the four "side walls" of a typical cavity are formed by the concentric conductors and the insulating blocks that separate them, with the "bottom" (radially outward) wall formed by the retaining ring that supports the endwindings against rotation. Cooling gas enters from the annular space between the conductors and the rotor spindle. Heat removal is thus limited by the low circulation velocity of the gas in the cavity and the limited amount of the gas that can enter and leave these spaces.

In typical configurations, the cooling gas in the end region has not yet been fully accelerated to rotor speed, that is, the cooling gas is rotating at part rotor speed. As the fluid is driven into a cavity by means of the relative velocity impact between the rotor and the fluid, the heat transfer coefficient is typically highest near the spaceblock that is downstream relative to the flow direction—where the fluid enters with high momentum and where the fluid coolant is coldest. The heat transfer coefficient is also typically high around the cavity periphery. The center of the cavity receives the least cooling.

Increasing the heat removal capability of passive cooling systems will increase the current carrying capability of the rotor providing increased rating capability of the generator whole maintaining the advantage of low cost, simple and reliable construction.

U.S. Pat. No. 5,644,179, the disclosure of which is incorporated by reference describes a method for augmenting heat transfer by increasing the flow velocity of the large single flow circulation cell by introducing additional cooling flow directly into, and in the same direction as, the naturally occurring flow cell. This is shown in FIGS. 4 and 5. While this method increases the heat transfer in the cavity by augmenting the strength of the circulation cell, the center region of the rotor cavity was still left with low velocity and therefore low heat transfer. The same low heat transfer still persists in the corner regions.

SUMMARY OF THE INVENTION

The invention provides a structure and method for enhancing cooling of the generator rotor by directing coolant flow towards the center of the cavities defined by and between the concentric rotor endwindings and the support blocks.

To redirect flow, In an exemplary implementation of the invention, at least one deflector is mounted to the face of the spaceblock disposed on the downstream side of the cavity to redistribute coolant flow towards the center of the cavity.

More specifically, the invention provides at least one deflector structure on the downstream face of at least one of the spaceblocks in a generator rotor endwinding assembly so as to redistribute flow in the respective cavity towards the normally starved center of the cavity, thus, substantially increasing heat transfer performance in the rotating assembly.

In one embodiment, the deflector extends substantially axially of the associated spaceblock to intercept a substantial portion of the coolant flow that reaches and/or flows along the radially inner portions of the spaceblock. That intercepted flow is redirected towards the center of the cavity. Coolant flow that flows generally directly to the spaceblocks radially outside the deflector structure will continue in its generally traditional circular flow path.

According to an alternate embodiment of the invention, the deflector structure spans only a portion of the axial dimension or depth of the cavity. This allows some high momentum coolant to reach the outer radial corner of the cavity and directs the remainder of the coolant towards the center of the cavity. The partial depth deflector may be disposed to span the part depth of the cavity from adjacent one endwinding wall of the cavity, adjacent the other endwinding wall of the cavity or generally centrally of its associated spaceblock. In this embodiment, the deflector spans about one half of the depth of the associated spaceblock.

According to yet another alternate embodiment of the invention, two or more axially aligned deflector structures are provided, each spanning a portion of the axial dimension or depth of the cavity. This allows some high momentum coolant to flow between axially adjacent deflector structures to reach the outer radial corner of the cavity and directs the remainder of the coolant towards the center of the cavity.

BRIEF DESCRIPTION OF THE DRAWINGS

These, as well as other objects and advantages of this invention, will be more completely understood and appreciated by careful study of the following more detailed description of the presently preferred exemplary embodiments of the invention taken in conjunction with the accompanying drawings, in which.

DETAILED DESCRIPTION OF THE INVENTION

Figure 1:
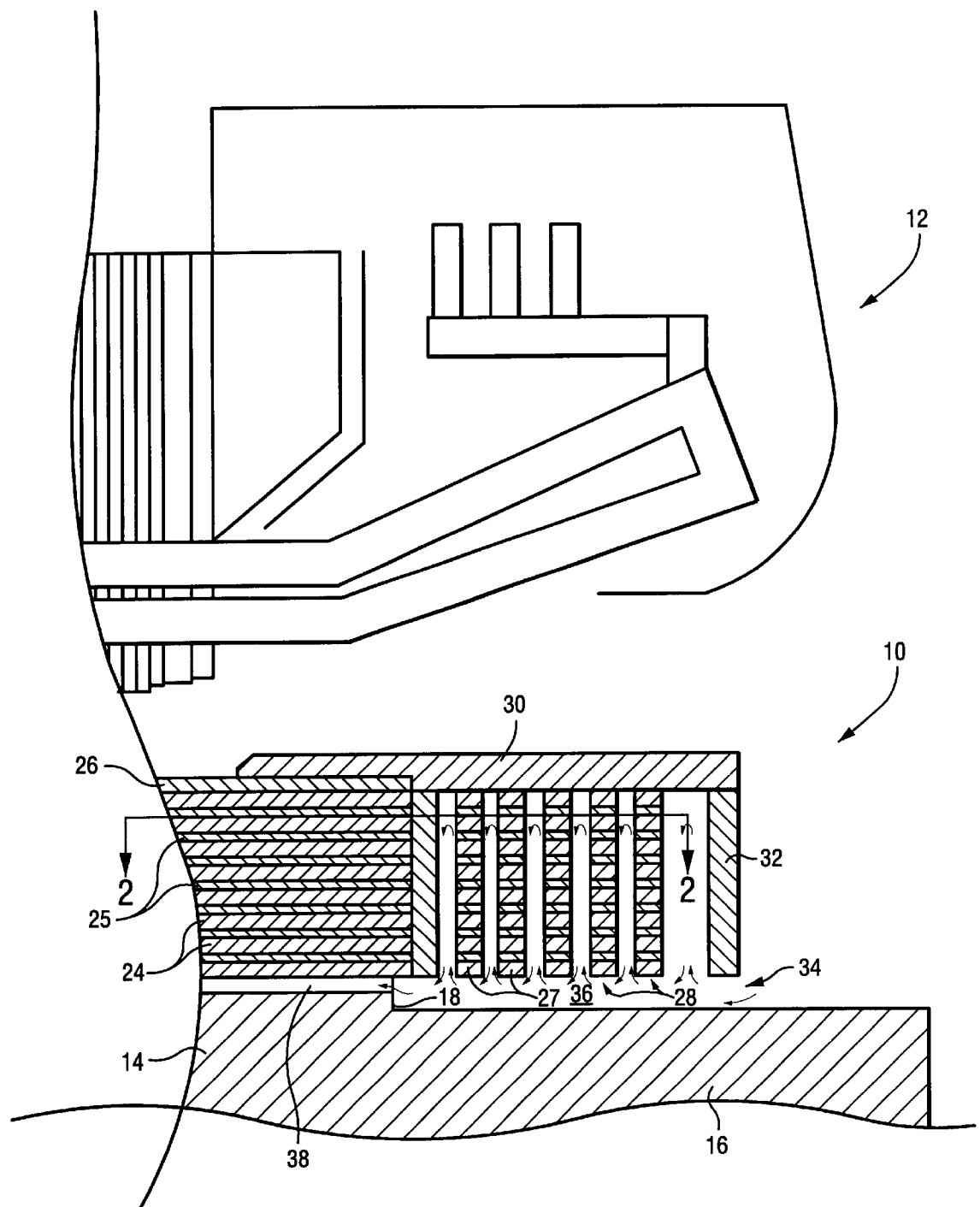
FIG. 1 is a cross-sectional view of a portion of the end turn region of a dynamoelectric machine rotor with stator in opposed facing relation thereto.
Figure 2:
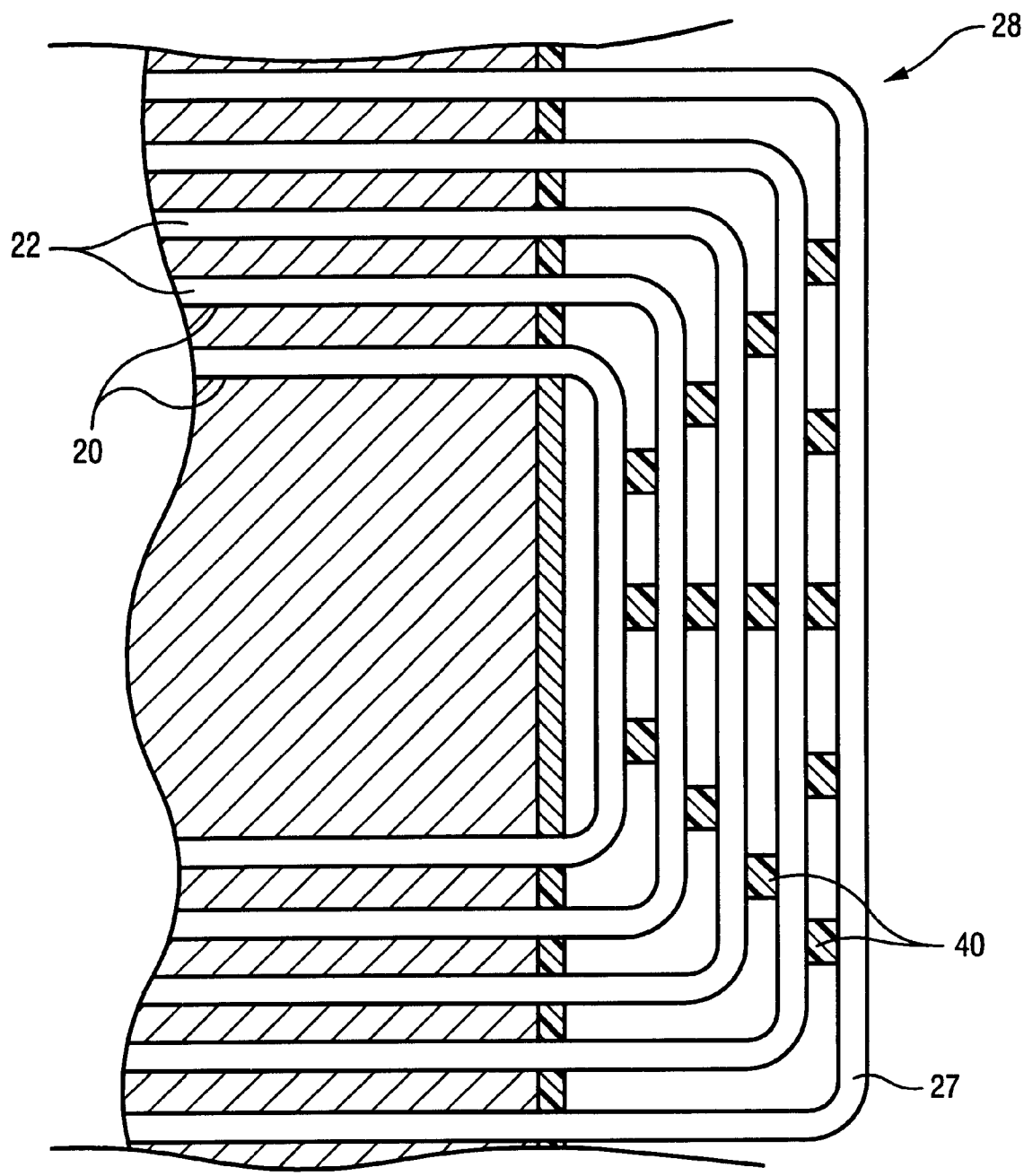
FIG. 2 is a cross-sectional top view of the dynamoelectric machine rotor taken along line 2—2 of FIG. 1.

Referring to the drawings wherein identical reference numerals denote the same elements throughout the various views, FIGS. 1 and 2 show a rotor 10 for a gas-cooled dynamoelectric machine, which also includes a stator 12 surrounding the rotor. The rotor includes a generally cylindrical body portion 14 centrally disposed on a rotor spindle 16 and having axially opposing end faces, of which a portion 18 of one end face is shown in FIG. 1. The body portion is provided with a plurality of circumferentially-spaced, axially extending slots 20 for receiving concentrically arranged coils 22, which make up the rotor winding. For clarity, only five rotor coils are shown, although several more are commonly used in practice.

Specifically, a number of conductor bars 24 constituting a portion of the rotor winding are stacked in each one of the slots. Adjacent conductor bars are separated by layers of electrical insulation 25. The stacked conductor bars are typically maintained in the slots by wedges 26 (FIG. 1) and are made of a conductive material such as copper. The conductor bars 24 are interconnected at each opposing end of the body portion by end turns 27, which extend axially beyond the end faces to form stacked endwindings 28. The end turns are also separated by layers of electrical insulation.

Referring specifically to FIG. 1, a retaining ring 30 is disposed around the end turns at each end of the body portion to hold the endwindings in place against centrifugal forces. The retaining ring is fixed at one end to the body portion and extends out over the rotor spindle 16. A centering ring 32 is attached to the distal end of the retaining ring 30. It should be noted that the retaining ring 30 and the center ring 32 can be mounted in other ways, as is known in the art. The inner peripheral edge of the centering ring 32 is radially spaced from the rotor spindle 16 so as to form a gas inlet passage 34 and the endwindings 28 are spaced from the spindle 16 so as to define an annular region 36. A number of axial cooling channels 38 formed along slots 20 are provided in fluid communication with the gas inlet passage 34 via the annular region 36 to deliver cooling gas to the coils 22.

Figure 3:
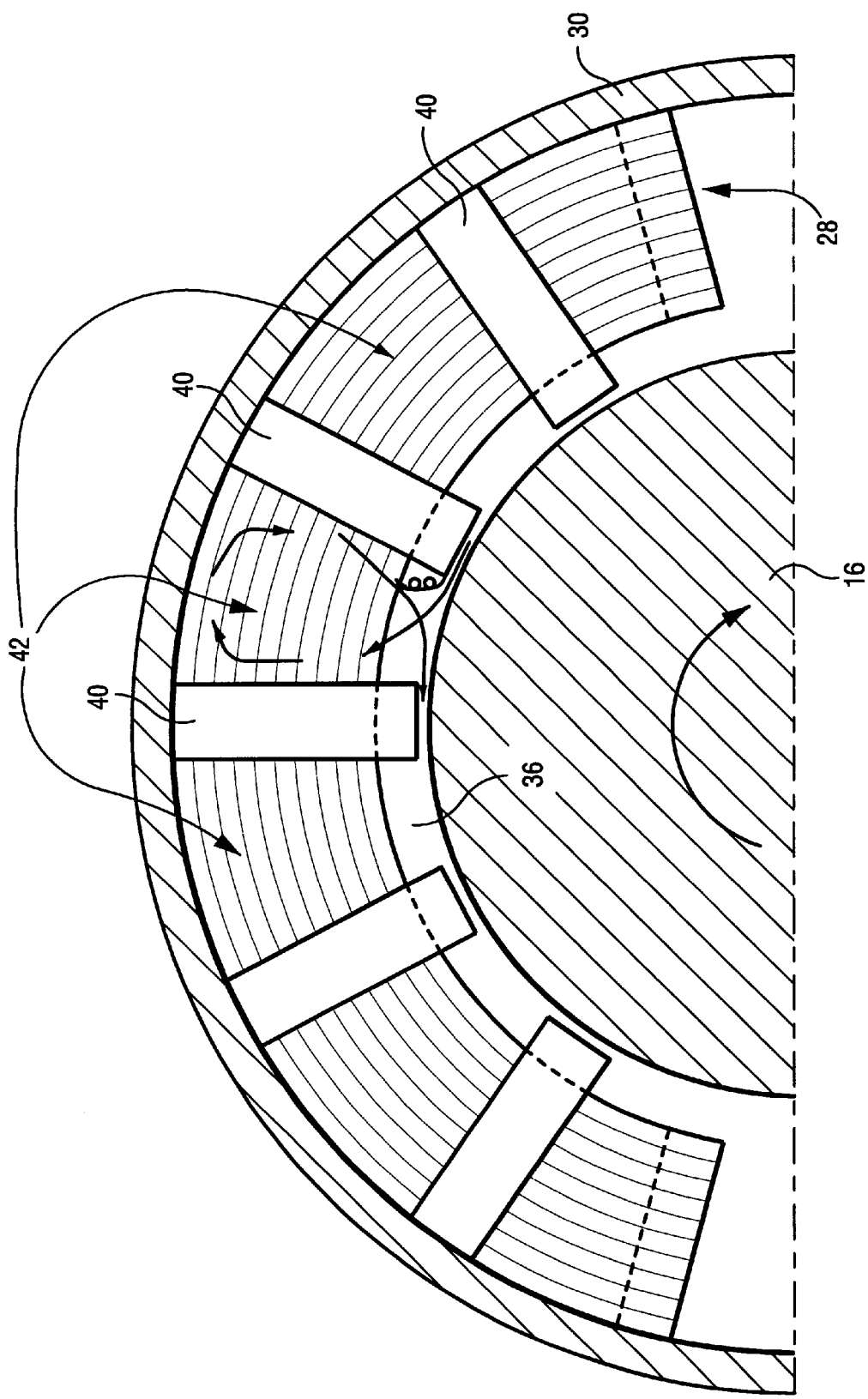
FIG. 3 is a schematic illustration showing passive gas flow into and through endwinding cavities.
Figure 4:
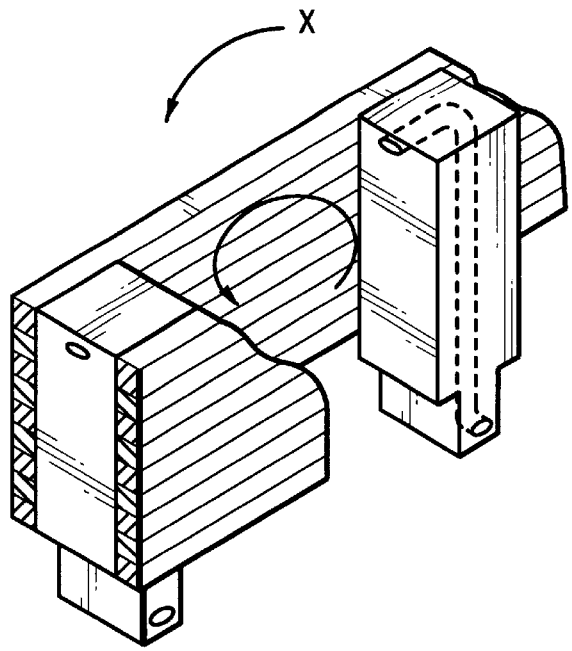
FIG. 4 is a perspective view, partly broken-away of a portion of the rotor end turn region in accordance with a first embodiment of the invention disclosed in U.S. Pat. No. 5,644,179.
Figure 5:
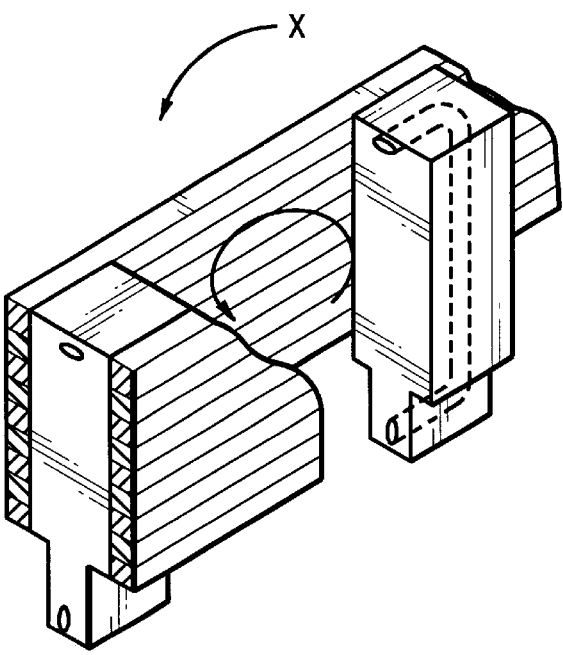
FIG. 5 is a perspective view, partly broken away, of a portion of the rotor end turn region showing a second embodiment of the invention of U.S. Pat. No. 5,644,179.

Turning to FIG. 2, the endwindings 28 at each end of the rotor 10 are circumferentially and axially separated by a number of spacers or spaceblocks 40. (For clarity of illustration, the spaceblocks are not shown in FIG. 1). The spaceblocks are elongated blocks of an insulating material located in the spaces between adjacent endwindings 28 and extend beyond the full radial depth of the endwindings into the annular gap 36. Accordingly, the spaces between the concentric stacks of the end turns 27 are divided into cavities. These cavities are bounded on the top by the retaining ring 30 and on four sides by adjacent endwindings 28 and adjacent spaceblocks 40, as shown in FIG. 3. As best seen in FIG. 1, each of these cavities is in fluid communication with the gas inlet passage 34 via the annular region 36. A portion of the cooling gas entering the annular region 36 between the endwinding 28 and the rotor spindle 16 through the gas inlet passage 34 thus enters the cavities 42, circulates therein, and then returns to the annular region 36 between the endwinding and the rotor spindle. Air flow is shown by the arrows in FIGS. 1 and 3.

The inherent pumping action and rotational forces acting in a rotating generator cavity typically produce a large single flow circulation cell, as schematically shown in FIG. 3. This flow circulation cell exhibits its highest velocity near the peripheral edges of the cavity, leaving the center region inadequately cooled due to the inherently low velocity in the center region of the cavity. As can be seen from FIG. 3, large areas of the corner regions are also inadequately cooled because the circular motion of the flow cell does not carry cooling flow into the corners.

Figure 6:
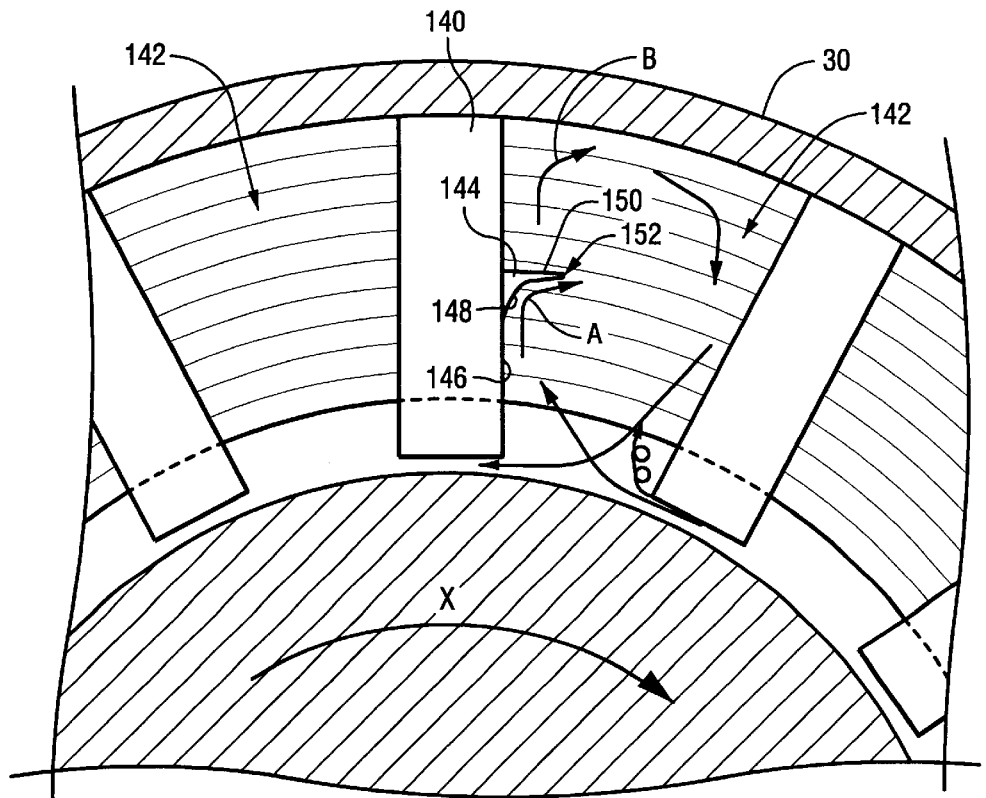
FIG. 6 is a cross-sectional view illustrating a deflector as an embodiment of the invention provided on the downstream side of a spaceblock to deflect coolant towards the normally starved center of the cavity.

Referring now to FIG. 6, there is illustrated a partial section of the rotor endwinding assembly showing some of the cavities 142 with the direction of rotation indicated by arrow X. According to an embodiment of the invention, at least one and preferably each spaceblock 140 is provided with a deflector structure 144 on the surface 146 thereof disposed on the downstream side of the respective cavity (hereinafter downstream surface) for redistributing coolant flow to the center of the respective cavity 142 to increase the heat transfer coefficient there. Each deflector structure 144 has a lower generally curved surface 148 for intercepting and redirecting flow as shown by arrow A. The upper surface 150 is generally planer so that the deflector defines a generally thin flow facing edge 152 so as to effectively intercept flow without unnecessary pressure loss.

In operation, rotor rotation in direction X will cause cooling gas to be drawn through the gas inlet 34 (FIG. 1) into the annular region 36 between the end winding 28 and the rotor spindle 16. A kinetic pressure head is present which drives the cooling gas toward the downstream side 146 of the cavity 142 in a generally circular flow. However, in the embodiment illustrated in FIG. 6, at least a portion of the coolant flow is intercepted by the deflector 144 and redirected as shown by arrow A to the central region of the cooling cavity 142, which would otherwise be generally starved of coolant flow. Coolant flow that is not intercepted by the deflector continues in its generally circulatory flow as shown by arrow B. The intercepted flow and the non-intercepted flow are rejoined on the upstream side of the cavity and continue in a clockwise direction, in the illustrated configuration, under the spaceblock 140 and into the next sequential cavity. In this embodiment, a single flow deflector is provided that spans a substantial portion of the depth or axial dimension of the cavity, for example, at least about 75% and more preferably on the order of 100% of the depth of the cavity.

Figure 7:
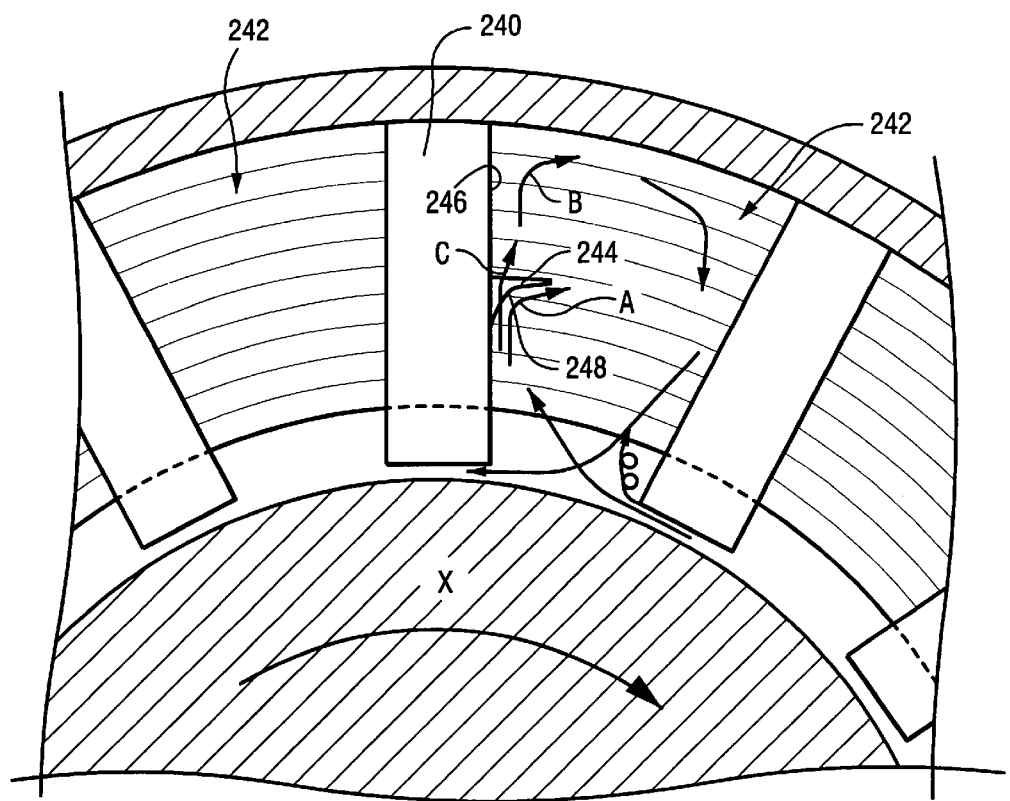
FIG. 7 illustrates an alternate embodiment of the invention wherein at least one deflector is provided to each only partially span the depth of the cavity to allow some of the coolant to easily pass to the outer radial extent of the cavity while deflecting a portion of the coolant towards the cavity center.

Turning now to FIG. 7, a second embodiment of the present invention is shown. More specifically, FIG. 7 shows a partial section of the rotor endwinding showing the cavities 242 defined between the spaceblocks 240 and with the direction with rotation indicated by arrow X. As illustrated, at least one deflector structure 244 is provided to deflect coolant flow to the central region of the adjacent cavity. As in the embodiment of FIG. 6, in the illustrated assembly, the defector structure(s) 244 are provided on the downstream surface 246 of at least one spaceblock 240. However, in this embodiment, each deflector 244 extends only a part depth or part axially of the spaceblock so as to leave at least one a vertical flow region for some high momentum circulating coolant flow to reach the outer radial corner of the cavity while the remainder of the coolant is deflected towards the center of the cavity.

According to this embodiment, a partial depth deflector may be disposed to span the part depth of the cavity from adjacent one endwinding wall of the cavity, adjacent the other endwinding wall of the cavity, or generally centrally of its associated spaceblock. In an exemplary embodiment, a single deflector 244 is provided to span about one half of the depth of the associated spaceblock. According to an alternate embodiment, also represented by the schematic illustration of FIG. 7, two or more axially aligned deflector structures are provided, each spanning a portion of the axial dimension or depth of the cavity. In this manner, at least one vertical flow region is reserved for high momentum circulating coolant flow to reach the outer radial corner of the cavity while the remainder of the coolant is deflected towards the center of the cavity.

Thus, as illustrated, the coolant flow into the respective cavity 242 will flow to and begin its flow radially outwardly along the spaceblock surface 246. A portion of that flow is intercepted and deflected by the deflector structure(s) 244 toward the central region of the respective cavity as shown by arrow A. The remainder of the coolant flow bypasses the deflector structure because of the gaps defined by its truncated axial length and continues up and radially outwardly along the spaceblock, as shown by arrow C, for continuing as circulating flow, as shown by arrow B. The deflected flow and the non-deflected flow are rejoined at the upstream side of the cavity to continue in a clockwise direction, in the illustrated embodiment, below and around the spaceblock 240 to the next sequential cavity 242.

In the presently preferred embodiment, the deflector 144, 244 extends at least about 20% and more preferably at least about 25% of the circumferential dimension of the cooling cavity so as to effectively intercept and redirect the flow towards the central region of the cavity, rather than merely causing surface turbulence. The curved configuration of the lower surface 148, 248 of the deflector enhances the deflector function.

While the invention has been described in connection with what is presently considered to be the most practical and preferred embodiment, it is to be understood that the invention is not to be limited to the disclosed embodiments, but on the contrary, is intended to cover various modifications and equivalent arrangements included within the spirit and scope of the appended claims.

What is claimed is:

1. A gas cooled dynamoelectric machine, comprising:
   a rotor having a body portion, said rotor having axially extending coils and end turns defining a plurality of endwindings extending axially beyond at least one end of said body portion;
   at least one spaceblock located between adjacent said endwindings so as to define a cavity therebetween; and
   at least one flow deflector structure provided on a cavity facing surface of said spaceblock for intercepting and redirecting circulating coolant flow in said cavity towards a central region of said cavity.

2. The dynamoelectric machine of claim 1, wherein said flow deflector structure is disposed on a circumferentially oriented surface of said spaceblock.

3. The dynamoelectric machine of claim 2, wherein said circumferentially oriented surface is on a downstream side of said cavity.

4. The dynamoelectric machine of claim 1, wherein a single flow deflector structure is provided on said spaceblock.

5. The dynamoelectric machine of claim 4, wherein said single flow deflector structure spans a substantial portion of a depth of said cavity.

6. The dynamoelectric machine of claim 4, wherein said single flow deflector structure spans about one half of a depth of said cavity.

7. The dynamoelectric machine of claim 1, wherein there are a plurality of axially aligned deflector structures disposed on said spaceblock.

8. The dynamoelectric machine of claim 7, wherein said there are axial gaps between said deflector structures.

9. The dynamoelectric machine of claim 1, wherein each said flow deflector structure has a curved flow intercepting and redirecting surface.

10. The dynamoelectric machine of claim 1, wherein each said flow deflector structure extends from the spaceblock at least about 20% of the circumferential dimension of the respective cavity.

11. A gas cooled dynamoelectric machine, comprising:

a rotor having a spindle and a body portion;

a rotor winding comprising axially extending coils disposed on said body portion and spaced, concentric endwindings extending axially beyond at least one end of said body portion, said endwindings and said spindle defining an annular space therebetween;

a plurality of spaceblocks located between adjacent ones of said endwindings thereby to define a plurality of cavities, each bounded by adjacent spaceblocks and adjacent endwindings and open to said annular space; and at least one flow deflector structure provided on a cavity facing surface of at least one said spaceblock for intercepting and redirecting circulating coolant flow towards a central region of the respective cavity.

12. The dynamoelectric machine of claim 11, wherein said flow deflector structure is disposed on a circumferentially oriented surface of said spaceblock.

13. The dynamoelectric machine of claim 12, wherein said circumferentially oriented surface is on a downstream side of said cavity.

14. The dynamoelectric machine of claim 11, wherein a single flow deflector structure is provided on said spaceblock.

15. The dynamoelectric machine of claim 14, wherein said single flow deflector structure spans a substantial portion of a depth of said cavity.

16. The dynamoelectric machine of claim 14, wherein said single flow deflector structure spans about one half of a depth of said cavity.

17. The dynamoelectric machine of claim 11, wherein there are a plurality of axially aligned deflector structures disposed on said spaceblock.

18. The dynamoelectric machine of claim 17, wherein said there are axial gaps between said deflector structures for passage of circulating coolant flow to radially outward portions of the cavity.

19. The dynamoelectric machine of claim 11, wherein each said flow deflector structure has a curved flow intercepting and redirecting surface.

20. The dynamoelectric machine of claim 11, wherein each said flow deflector structure extends from the spaceblock at least about 20% of the circumferential dimension of the respective cavity.

* * * * *